US011201821B2

(12) United States Patent
Vedantham et al.

(10) Patent No.: US 11,201,821 B2
(45) Date of Patent: Dec. 14, 2021

(54) DYNAMIC MEDIUM SWITCHING FOR HYBRID NETWORKS

(71) Applicant: TEXAS INSTRUMENTS INCORPORATED, Dallas, TX (US)

(72) Inventors: Ramanuja Vedantham, Allen, TX (US); Jiun-Ren Lin, Pittsburgh, PA (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 80 days.

(21) Appl. No.: 16/148,175

(22) Filed: Oct. 1, 2018

(65) Prior Publication Data

US 2019/0132244 A1 May 2, 2019

Related U.S. Application Data

(63) Continuation of application No. 14/519,990, filed on Oct. 21, 2014, now Pat. No. 10,091,101.

(60) Provisional application No. 61/893,432, filed on Oct. 21, 2013.

(51) Int. Cl.
*H04L 12/00* (2006.01)
*H04L 12/721* (2013.01)
*H04W 40/12* (2009.01)

(52) U.S. Cl.
CPC ............ *H04L 45/70* (2013.01); *H04L 45/124* (2013.01); *H04W 40/12* (2013.01); *Y02D 30/70* (2020.08)

(58) Field of Classification Search
None
See application file for complete search history.

(56) References Cited

U.S. PATENT DOCUMENTS

| 9,001,787 | B1 | 4/2015 | Conant et al. |
| 10,091,101 | B2* | 10/2018 | Vedantham ............. H04L 45/70 |
| 2002/0080774 | A1 | 6/2002 | Griffith et al. |
| 2006/0075124 | A1 | 4/2006 | Dougherty et al. |
| 2006/0221998 | A1* | 10/2006 | Livet ......................... H04L 1/20 370/464 |
| 2009/0201899 | A1 | 8/2009 | Liu |
| 2009/0238075 | A1* | 9/2009 | Mosko .................... H04L 45/00 370/238 |
| 2010/0202358 | A1* | 8/2010 | Wu ..................... H04L 12/5692 370/328 |
| 2013/0028104 | A1* | 1/2013 | Hui ..................... H04W 40/125 370/252 |

(Continued)

*Primary Examiner* — Noel R Beharry
*Assistant Examiner* — Lionel Preval
(74) *Attorney, Agent, or Firm* — Charles F. Koch; Charles A. Brill; Frank D. Cimino (57) ABSTRACT

A method and apparatus for dynamic medium switching in a hybrid network. A method for packet transmission by a combo device includes maintaining a wireless network confidence rating value that is indicative of packet transfer reliability of a wireless network accessed by the device. A wired network confidence rating value that is indicative of packet transfer reliability of a wired network accessed by the device is also maintained. One of the wireless network and the wired network to be used for initial transmission of the data packet is selected based on which of the wireless confidence rating value and the wired confidence rating value is indicative of a higher likelihood of the packet being successfully transmitted. The packet is routed to be transmitted via the selected network.

20 Claims, 5 Drawing Sheets

(56) References Cited

U.S. PATENT DOCUMENTS

| | | | |
|---|---|---|---|
| 2013/0223229 A1* | 8/2013 | Hui | H04L 45/123 370/238 |
| 2014/0036702 A1 | 2/2014 | Van Wyk et al. | |
| 2015/0023348 A1* | 1/2015 | Hui | H04L 49/20 370/392 |
| 2015/0038156 A1 | 2/2015 | Kilpatrick, II et al. | |

\* cited by examiner

FIG. 9

DYNAMIC MEDIUM SWITCHING FOR HYBRID NETWORKS

CROSS-REFERENCE TO RELATED APPLICATIONS

The present application is a continuation of U.S. patent application Ser. No. 14/519,990 filed on Oct. 21, 2014, which claims priority to U.S. Provisional Patent Application No. 61/893,432, filed on Oct. 21, 2013, entitled "Dynamic Medium Switching Algorithm for Hybrid Smart Grid Networks," all of which are hereby incorporated herein by reference in their entireties.

BACKGROUND

The "smart grid" generally refers to electricity delivery systems that use computer-based remote control to manage power delivery. The systems include two-way communication technology and processing that facilitate enemy delivery and use measurement. Each device connected to the smart grid may include sensors to collect energy use and network status information; and network transceiver electronics to provide communication between devices.

SUMMARY

A method and apparatus for dynamic medium switching in a hybrid network are disclosed herein. In one embodiment, a wireless device includes a wireless transceiver, a wired transceiver, and medium switching logic. The wireless transceiver is configured for transfer of data packets via a wireless network. The wired transceiver is configured for transfer of data packets via a wired network. The medium switching logic determines which of the wireless transceiver and the wired transceiver is to be used to transmit a data packet. The medium switching logic is configured to maintain a wireless network confidence rating value that is indicative of packet transfer reliability of the wireless network, and to maintain a wired network confidence rating value that is indicative of packet transfer reliability of the wired network. The medium switching logic is also configured to select one of the wireless transceiver and the wired transceiver to be used for initial transmission of the data packet based on which of the wireless confidence rating value and the wired confidence rating value is indicative of a higher likelihood of the packet being successfully transmitted, and to route the packet to the selected transceiver for transmission.

In another embodiment, a method for packet transmission by a combo device includes maintaining a wireless network confidence rating value that is indicative of packet transfer reliability of a wireless network accessed by the device. A wired network confidence rating value that is indicative of packet transfer reliability of a wired network accessed by the device is also maintained. One of the wireless network and the wired network to be used for initial transmission of the data packet is selected based on which of the wireless confidence rating value and the wired confidence rating value is indicative of a higher likelihood of the packet being successfully transmitted. The packet is routed to a transceiver of the combo node for transmission via the selected network.

In a further embodiment, a smart grid network includes a plurality of nodes communicatively coupled via a wired network or a wireless network. At least one of the nodes includes medium switching logic that determines which of the wireless network and the wired network is to be used to transmit a data packet. The medium switching logic is configured to maintain a wireless network confidence rating value that is indicative of packet transfer reliability of the wireless network, and to maintain a wired network confidence rating value that is indicative of packet transfer reliability of the wired network. The medium switching logic is also configured to select one of the wireless network and the wired network to be used for initial transmission of the data packet based on which of the wireless confidence rating value and the wired confidence rating value is indicative of a higher likelihood of the packet being successfully transmitted. The medium switching logic is further configured to select a retransmission allowance that defines a number of allowable transmission attempts for the initial transmission. The retransmission allowance is determined based on a difference of the wired network confidence rating and the wireless network confidence rating. The medium switching logic is also configured to provide the data packet and retransmission allowance to transmission logic for packet transmission via the selected network.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a conventional smart grid network, devices communicate using either Radio Frequency (RF) or Power Line Communication (PLC). In order to provide better system reliability, better coverage, and larger network throughput, some smart grid networks may include combo nodes that support both RF and PLC links. The combo nodes can dynamically select the optimal link over which to forward a data packet. The method for determining the optimal link over which to transmit a packet is referred to herein as a Dynamic Medium Switching Algorithm (DMSA).

Embodiments of the present disclosure include DMSA logic that provides improved system performance in hybrid smart grid networks. Devices implementing the DMSA dynamically determine, based on channel condition and other variables, what medium to employ to transfer a data packet.

Figure 1:
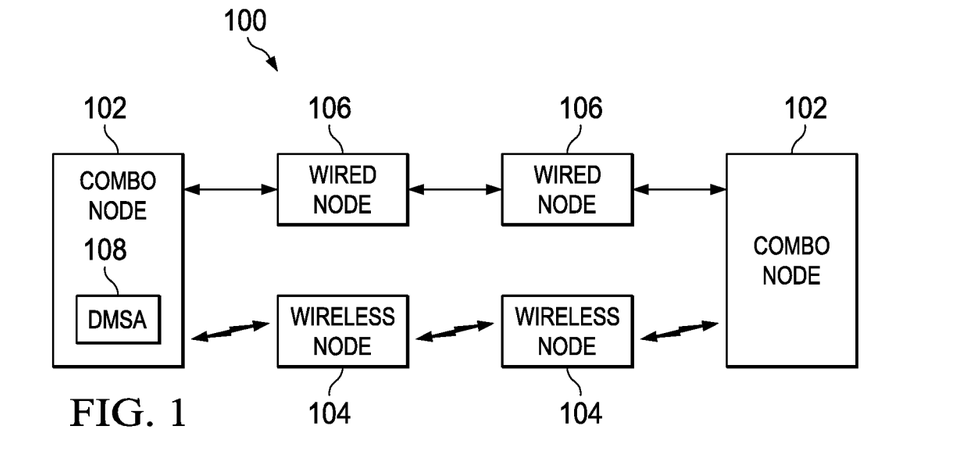
FIG. 1 shows a block diagram of a hybrid network in accordance with various embodiments.

FIG. 1 shows a block diagram of a hybrid network 100 in accordance with various embodiments. The network 100 includes wired nodes 106, wireless nodes 104 and combo nodes 102. The nodes 102, 104, and 106 are communication devices. The wired nodes 106 communicate via an electrically conductive medium, such as wiring. The wireless nodes 104 communicate wirelessly via radio frequency electromagnetic signals. The combo nodes 102 can selectively communicate via the conductive medium or the wireless medium. In some embodiments of the network 100, the wired nodes 106 and combo nodes 102 may form a wired network that communicates via the conductors of an electrical power distribution system using protocols specified by a standard such as IEEE 1901.2, the G3-PLC standard, or other power line communication standard. The wireless nodes 104 and the combo nodes 102 may form a wireless network that communicates using protocols specified by a standard such as IEEE 802.15.4, IEEE 802.11, or other wireless communication standard.

The combo nodes 102 include DMSA system 108. The DMSA system 108 maintains confidence rating values for packet transfers via the wired and wireless networks, and selects, for each packet to be transmitted by the combo node 102, the network most likely to provide successful transfer of the packet to a destination device. The confidence ratings are based on historical performance of the wired and wireless networks measured by each combo node 102. By selecting the network most likely to produce successful data transfer for each packet, the combo node 102 increases the probability of successful data transfer while reducing the number of retransmissions needed to provide successful transfer.

Figure 2:
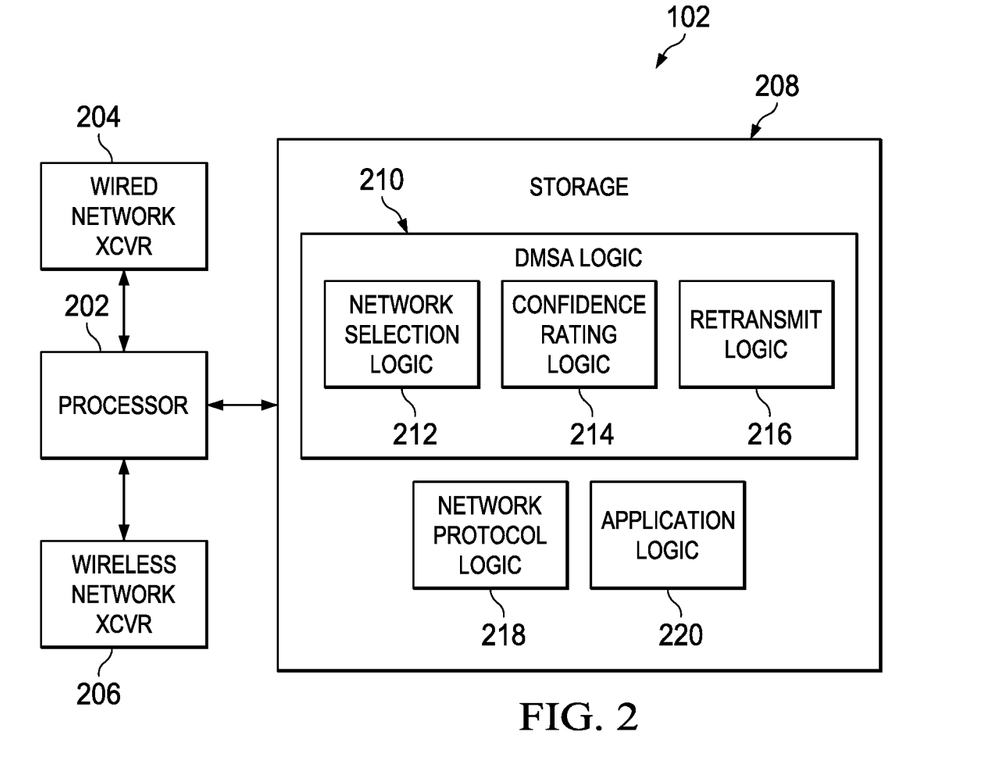
FIG. 2 shows a block diagram of a combo node in accordance with various embodiments.

FIG. 2 shows a block diagram of a combo node 102 in accordance with various embodiments. The combo node 102 includes a processor 202, a wired network transceiver 204, a wireless network transceiver 206, and storage 208. The combo node 102 may include various other components and subsystems that have been omitted from FIG. 2 in the interest of clarity. For example, the combo node 102 may include power systems that provide electrical power to the circuitry of the combo node 102, sensors that allow the combo node 102 to measure parameters of operation, and/or other components or sub-systems.

The wired network transceiver 204 couples the combo node 102 to the wired network, and provides modulation, encoding, signal drive, and other functionality needed to access and transfer data via the wired network. Similarly, the wireless network transceiver 206 couples the combo node 102 to the wireless network, and provides modulation, encoding, signal drive, and other functionality needed to access and transfer data via the wireless network.

The processor 202 is coupled to the wired transceiver 204 and the wireless transceiver 206, and may be a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

The storage 208 is a non-transitory computer-readable storage medium suitable for storing instructions executable by the processor 202. The storage 208 may include volatile storage such as static and/or dynamic random access memory, or other volatile memory. The storage 208 may also include non-volatile storage, such FLASH storage, read-only-memory, or other non-volatile storage. The storage 208 includes application logic 202, network protocol logic 218, and DMSA logic 210. The DMSA system 108 shown in FIG. 1 comprises the processor 202 and the DMSA logic 210.

Application logic 220 includes instructions of various applications executed by the combo node 102. For example, an application may periodically read a sensor coupled to the processor 202 and transfer a measurement value to a destination device via the hybrid network 100. The network protocol logic 218 includes instructions that implement at least a portion of a protocol stack applied to packets transmitted or received on each of the wired and wireless networks. The wired network may apply a different protocol stack than the wireless network. For example, the wired network may implement a protocol in accordance with the IEEE 1901.2 standard, and the wireless network may implement a protocol in accordance with the IEEE 802.15.4 standard.

Figure 3:
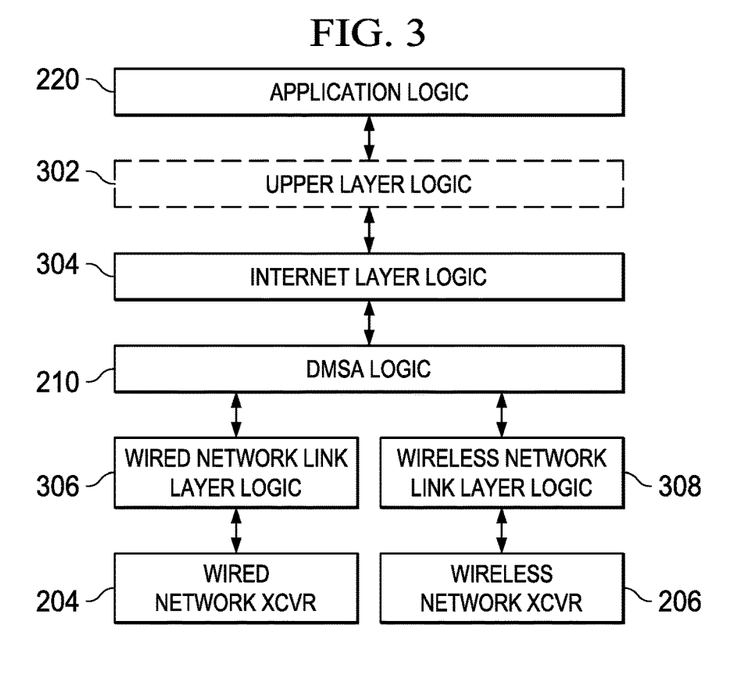
FIG. 3 shows arrangement of logic in a combo node in accordance with various embodiments.

The DMSA logic 210 includes instructions executed by the processor 202 to implement network selection for each packet transmitted by the combo node 102. FIG. 3 shows arrangement of logic in the combo node 102 in accordance with various embodiments. The protocol logic layers 302, 304, 306, and 308 may be provided by the network protocol logic 218. The DMSA logic 210 operates and transfers data between the internet layer logic 304 (e.g., IP layer logic) common to both wired and wireless networks and the link layer logic 306, 308 (e.g., medium access control logic) specific to each of the wired and wireless networks.

Figure 4:
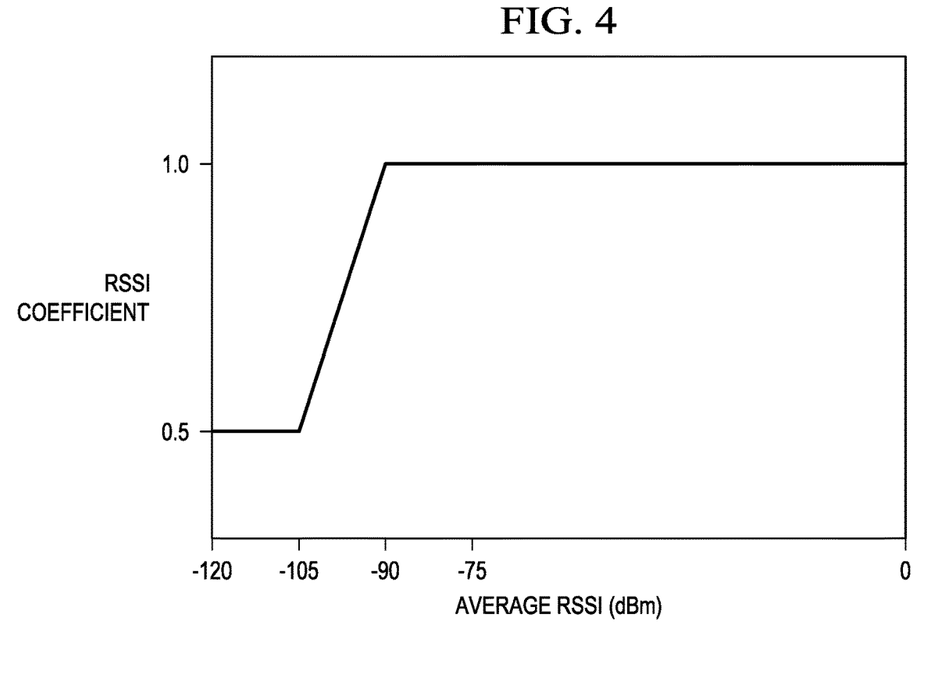
FIG. 4 shows a diagram illustrating assignment of received signal strength indicator coefficient values in accordance with various embodiments.
Figure 5:
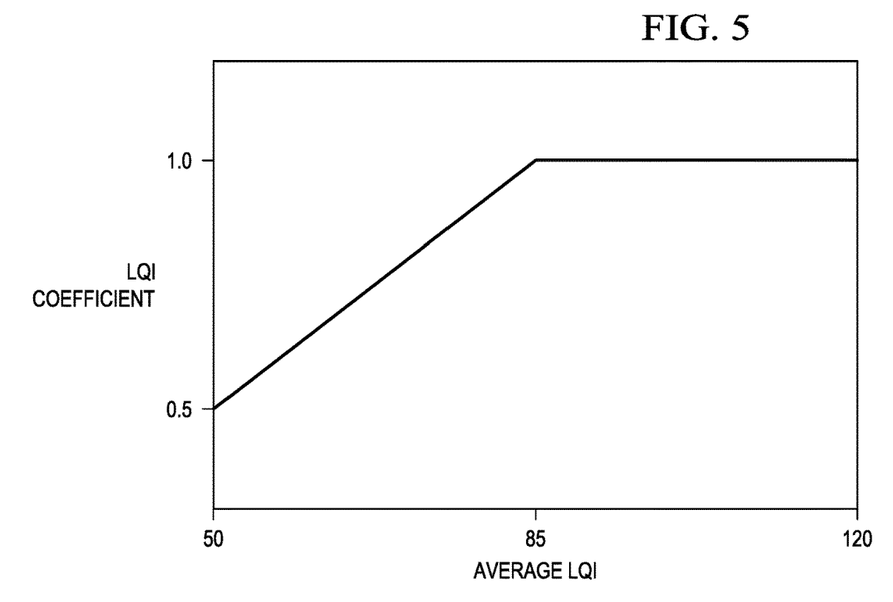
FIG. 5 shows a diagram illustrating assignment of link quality index coefficient values in accordance with various embodiments.

The DMSA logic 210 includes network selection logic 212, confidence rating logic 214 and retransmit logic 216. The confidence rating logic 214 computes and maintains a confidence rating value for the wired network and a confidence rating value for the wireless network. The confidence rating logic 214 may compute the confidence rating value for each network based on historical values of packet deliver ratio (PDR), received signal strength indicator (RSSI), and link quality indicator (LQI) for the network. In some embodiments, the confidence rating logic 214 may calculate a moving average of PDR, RSSI, and/or LQI based on previous data transmissions, and apply the average values to compute confidence rating. The confidence rating logic 214 may update the confidence rating value for a network based on results of each packet transmission via the network. Some embodiments of the confidence rating logic 214 may compute confidence rating as:

$$CR=xyP$$

where:
P is average historical PDR,
x is the RSSI coefficient, and
y is the LQI coefficient.
The confidence rating logic 214 may determine the RSSI coefficient and the LQI coefficient using the two functions respectively shown in FIG. 4 and FIG. 5.

For each packet transferred to the DMSA logic 210 from the internet layer logic 304, the DMSA logic 210 determines, based on the network confidence rating values, which of the wired and wireless networks is to be initially applied to transmit the packet. The network selected for initial transmission may be the network having the higher confidence rating. If confidence ratings of the two networks are equal, the network selection logic 212 may randomly select one of the networks, or apply an additional criterion to select the initial network.

Some embodiments of the network selection logic 212 may apply other metrics to select between the wired network and the wireless network. In some embodiments, load balancing may be implemented by selecting a destination node and/or network that attempts to ensure that the overall traffic served through any of the nodes serving as an intermediate router is similar. In some embodiments, the working life of battery powered nodes (e.g., wireless nodes 104) may be improved by route selection that minimizes the use of battery powered nodes as intermediate routing nodes, by selecting as many wired nodes 106 and combo nodes 102 as possible, where the wired nodes 106 and combo nodes 102 are powered via the power mains.

Figure 6A:
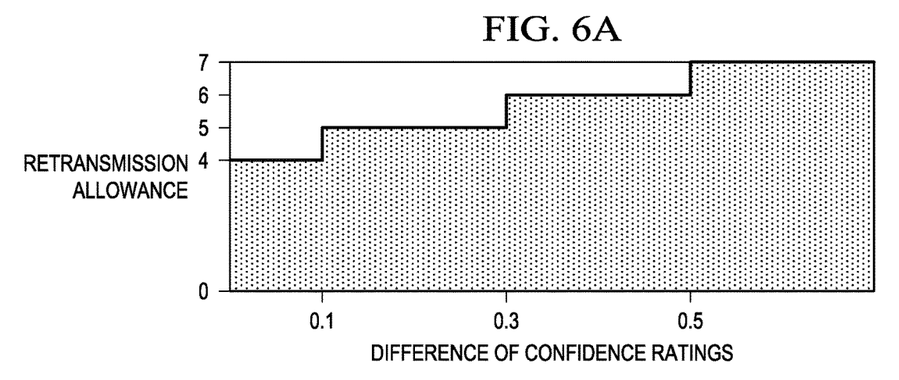
FIGS. 6A and 6B show a diagram illustrating assignment of retransmission allowance values based on difference in confidence rating in accordance with various embodiments.
Figure 6B:
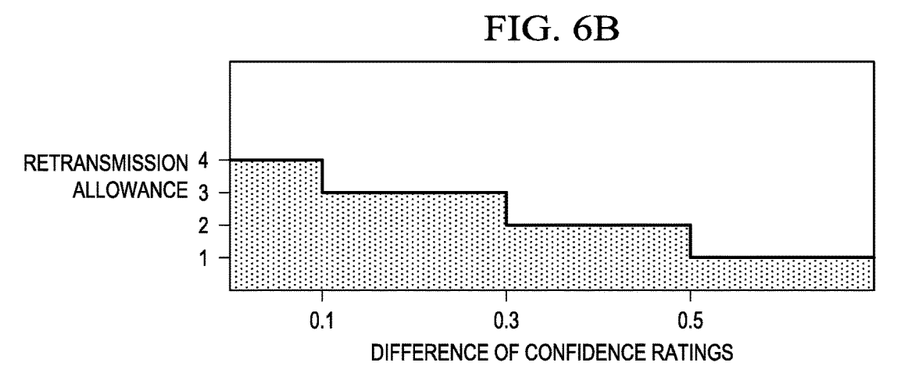

The retransmit logic 216 determines a retransmission allowance for each network. The retransmission allowance specifies the number of retransmission attempts allowed on the associated network. The retransmission allowance for a network may be determined based on the confidence rating of the network. FIGS. 6A and 6B show retransmission allowances for the wired and wireless networks respectively, where the retransmission allowance assigned to each network is based on a difference in confidence ratings computed for the networks. For example, if the network corresponding to FIG. 6A has a confidence rating value of 0.6, and the network corresponding to FIG. 6B has a confidence rating value of 0.2, then the difference of the two confidence rating values is 0.4. Accordingly, the retransmission allowance assigned to the network of corresponding to FIG. 6A is 6, and the retransmission allowance assigned to the network of corresponding to FIG. 6B is 2.

Considering the confidence rating values of 0.6 and 0.2 of the above example, the network selection logic 212 may select the network having the higher confidence rating value (0.6) as the initial network to apply for transmission of the packet. The DMSA logic 210 passes the packet and the retransmission allowance value assigned to the network to the link layer logic (e.g., wired network link layer logic 306). The link layer logic 306 attempts to successfully transmit the packet within the specified number of retransmission attempts.

If transmission of the packet via the initially selected network is unsuccessful, within the specified number of retransmission attempts, then control of packet transmission returns to the DMSA logic 210, and the network selection logic 212 selects the network not initially applied (e.g., the wireless network) for additional transmission attempts. The DMSA logic 210 passes the packet and the retransmission allowance value assigned to the secondary network to the link layer logic (e.g., wireless network link layer logic 308), and transmission of the packet is attempted via the secondary network. If transmission via the secondary network, within the retransmission allowance, is not successful, the control of packet transmission returns to the DMSA logic 210, and the network selection logic 212 may again attempt transmission via the initially selected network. In this manner, the DMSA logic 210 may alternate transmission attempts between the two different networks until transmission is successful or a predetermined maximum number of transmissions has been unsuccessfully attempted. The DMSA logic 210 may drop the packet if transmission is not successful within the maximum number of transmission attempts. With each attempted transmission of a packet, DMSA logic 210 receives network reliability information from the link layer logic, and the confidence rating logic 214 updates the confidence rating for the network on which packet transmission is attempted.

Figure 7:
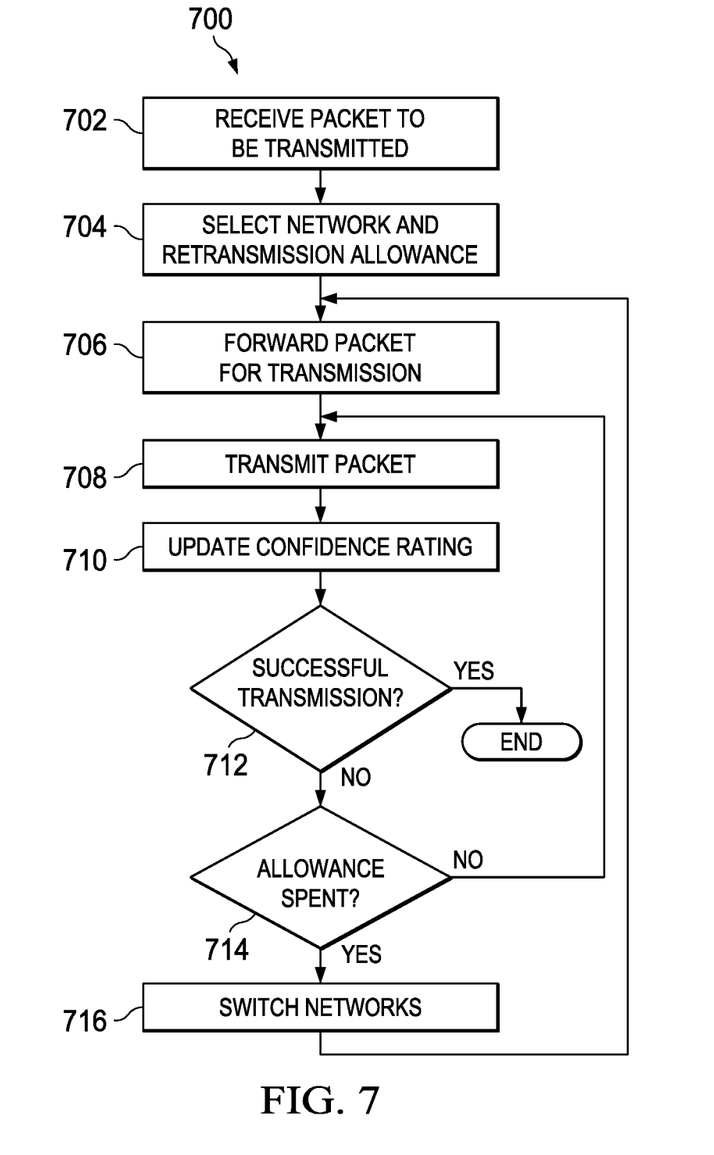
FIG. 7 shows a flow diagram for a method for medium switching in accordance with various embodiments.

FIG. 7 shows a flow diagram 700 for a method for medium switching in a combo node 102 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 700 may be performed by the processor 202 executing instructions retrieved from a non-transitory computer readable storage medium 208.

In block 702, the DMSA logic 210 of combo node 102 receives, from the internet layer logic 304, a packet to be transmitted. In some embodiments, the DMSA logic 210 may receive a packet to be transmitted from higher layer logic other than the internet layer logic 304.

In block 704, the DMSA logic 210 selects a network to apply for initial transmission attempts and assigns a retransmission allowance for use by the selected network. The selection of the network and retransmission allowance may be based on the confidence rating values of each network available to the combo node 102. For example, the network with the higher confidence rating may be selected as the network for initial transmission attempts and be assigned a higher retransmission allowance than the network not selected.

In block 706, the DMSA logic 210 forwards the packet to be transmitted and the assigned retransmission allowance to link layer logic associated with the selected network. The link layer logic forwards the packet to the transceiver of the combo node 102 associated with the selected network, and the packet is transmitted in block 708.

With each transmission attempt, in block 710, the DMSA logic 210 receives network reliability information from the link layer logic, and the DMSA logic 210 updates the confidence rating value for the network.

In block 712, if packet transmission is unsuccessful, and the retransmission allowance has not been spent, in block 714, then the link layer logic retransmits the packet.

In block 712, if packet transmission is unsuccessful, and the retransmission allowance has been spent, in block 714, then control of transmission returns to the DMSA logic 210. In block 716, the DMSA logic 210 switches networks by selecting the network not applied in the last transmission attempt, and forwards the packet and the retransmission allowance for the network to the link layer logic for the network. Switching of networks and attempted transmission may continue in this manner until a maximum number of transmission attempts have been unsuccessfully attempted. Thereafter, the DMSA logic 210 may drop the packet.

Figure 8:
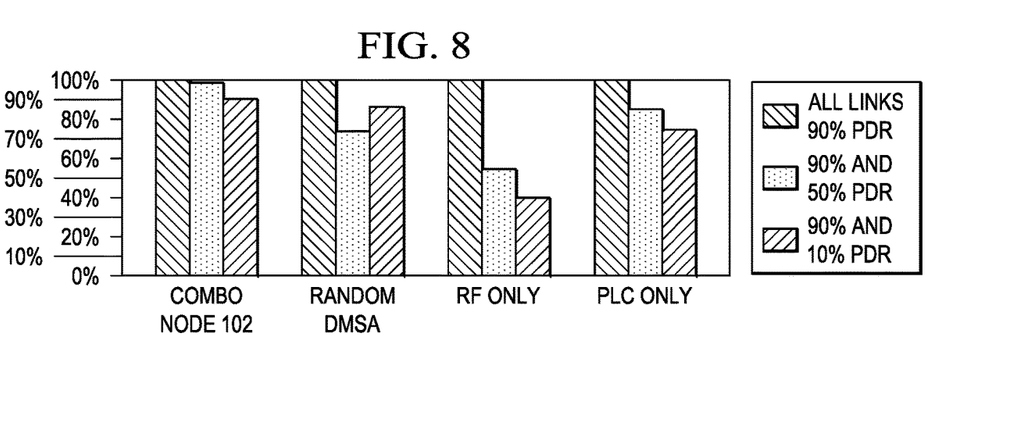
FIG. 8 shows average packet delivery ratios for various Dynamic Medium Switching Algorithm (DMSA) methods.

FIG. 8 shows average packet delivery ratios for various DMSA methods. FIG. 8 shows that using DMSA logic 210 the combo node 102 provides more reliable packet delivery than with other illustrated methods.

Figure 9:
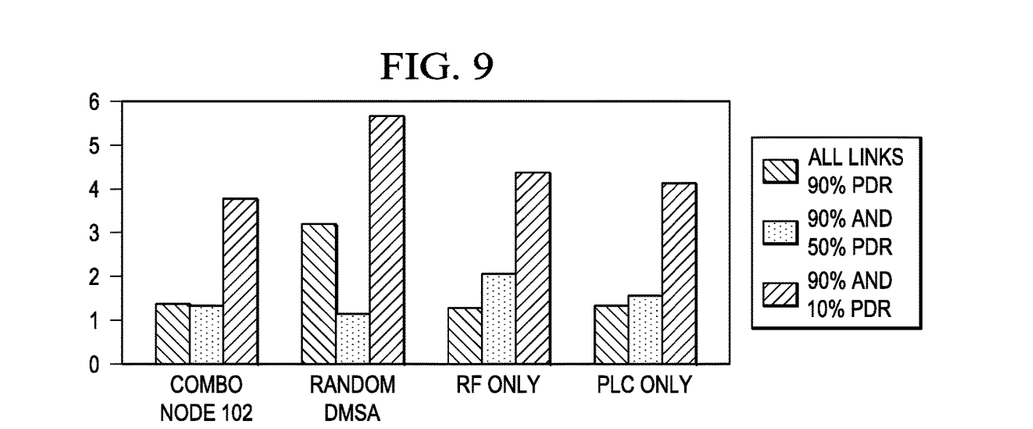
FIG. 9 shows average number of retransmissions required for successful data transfer for various DMSA methods.

FIG. 9 shows average number of retransmissions required for successful data transfer using various DMSA methods. FIG. 9 shows that using DMSA logic 210 the combo node 102 can provide successful packet transfer with fewer retransmissions than other methods.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device comprising:
   a first network transceiver configured to couple to a first network that conforms to a first protocol;
   a second network transceiver configured to couple to a second network that is different from the first network and that conforms to a second protocol that is different from the first protocol; and
   a processor coupled to the first network transceiver and the second network transceiver and configured to couple to a sensor to receive a measurement value from the sensor, wherein the processor is further configured to:
      compute a first confidence rating value for the first network based on a first metric from a group consisting of: a received signal strength indicator associated with the first network transceiver and a link quality indicator of the first network;
      compute a second confidence rating value for the second network based on a second metric from a group consisting of: a received signal strength indicator associated with the second network transceiver and a link quality indicator of the second network;
      select between transmitting the measurement value over the first network and transmitting the measurement value over the second network based on the first confidence rating value and the second confidence rating value; and
      based upon transmission of the measurement value over the first network is unsuccessful within a first number of retransmission attempts, attempt to transmit the measurement value over the second network within a second number of retransmission attempts.

2. The device of claim 1, wherein the processor is configured to compute the first confidence rating value further based on a packet delivery ratio of the first network.

3. The device of claim 1, wherein the processor is configured to select between transmitting the measurement value over the first network and transmitting the measurement value over the second network further based on a load of a node of the first network.

4. The device of claim 1, wherein the processor is configured to select between transmitting the measurement value over the first network and transmitting the measurement value over the second network further based on a count of battery-powered nodes within the first network.

5. The device of claim 1, wherein:
   the processor is further configured to determine the first number of retransmission attempts for the measurement value based on the first confidence rating value; and
   the processor is further configured to determine the second number of retransmission attempts for the measurement value based on the second confidence rating value.

6. The device of claim 5, wherein the processor is configured to determine the first number of retransmission attempts and the second number of retransmission attempts for the measurement value based on a difference between the first confidence rating value and the second confidence rating value.

7. The device of claim 5, wherein the processor is further configured to, based upon transmission of the measurement value over the second network is unsuccessful within the second number of retransmission attempts, alternate attempting transmission of the measurement value between the first network and the second network until the measurement value is successfully transmitted or a number of transmission attempts equals a maximum number of transmission attempts.

8. The device of claim 1, wherein the processor is further configured to update the first confidence rating value upon attempting to transmit the measurement value over the first network.

9. The device of claim 1, wherein the first network is a wireless network and the second network is a wired network.

10. A method comprising:
    receiving a value to transmit between a first node and a second node, wherein the first node and the second node are coupled by a first network and a second network that is separate and independent from the first network;
    determining a first confidence rating value for the first network based on at least one of: a received signal strength indicator of the first network or a link quality indicator of the first network;
    determining a second confidence rating value for the second network based on at least one of: a received signal strength indicator of the second network or a link quality indicator of the second network;
    selecting a network for transmitting the value from between the first network and the second network based on the first confidence rating value and the second confidence rating value;
    transmitting the value between the first node and the second node via the selected network; and
    based upon transmitting of the value over the selected network is unsuccessful within a first number of retransmission attempts, transmitting the value over an alternate network within a second number of retransmission attempts.

11. The method of claim 10, wherein the value is a measurement value received from a sensor.

12. The method of claim 10, wherein:
the first confidence rating value is determined based on a packet delivery ratio of the first network; and
the second confidence rating value is determined based a packet delivery ratio of the second network.

13. The method of claim 10, wherein the selecting of the network for transmitting the value from between the first network and the second network is further based on a load of the first network and a load of the second network.

14. The method of claim 10, wherein the selecting of the network for transmitting the value from between the first network and the second network is further based on a count of battery powered nodes within the first network and a count of battery powered nodes within the second network.

15. The method of claim 10 further comprising:
determining the first number of retransmission attempts for the transmitting the value over the selected network based on the first confidence rating value; and
determining the second number of retransmission attempts for the transmitting the value over the alternate network based on the second confidence rating value.

16. The method of claim 10 further comprising determining the first number of retransmission attempts and the second number of retransmission attempts for the transmitting the value over the selected network based on a difference between the first confidence rating value and the second confidence rating value.

17. A non-transitory computer-readable storage medium storing instructions that, when executed by at least one processor, cause the at least one processor to:
receive a measurement value from a sensor to transmit;
determine a first confidence rating value for a first network that conforms to a first protocol, wherein the first confidence rating value is based on a first metric from a group consisting of: a received signal strength indicator of the first network and a link quality indicator of the first network;
determine a second confidence rating value for a second network that conforms to a second protocol that is different from the first protocol, wherein the second confidence rating value is based on a second metric from a group consisting of: a received signal strength indicator of the second network and a link quality indicator of the second network;
select a network for transmitting the measurement value from between the first network and the second network based on the first confidence rating value and the second confidence rating value;
transmit the measurement value via the selected network; and
based upon transmission of the measurement value over the selected network is unsuccessful within a first number of retransmission attempts, transmit the measurement value over an alternate network within a second number of retransmission attempts.

18. The non-transitory computer-readable storage medium of claim 17, wherein the instructions to determine the first confidence rating value include instructions to determine the first confidence rating value further based on a packet delivery ratio of the first network.

19. The non-transitory computer-readable storage medium of claim 17, wherein the instructions to select the network include instructions to select the network further based on a load of a node of the first network.

20. The non-transitory computer-readable storage medium of claim 17, wherein the instructions to select the network include instructions to select the network further based on a count of battery-operated nodes within the first network.

* * * * *